May 22, 1962 A. RAGOSS ET AL 3,035,308
PRODUCTION OF GRAPHITIZABLE PITCH COKE AND GRAPHITE PRODUCTS
Filed Jan. 23, 1958 3 Sheets—Sheet 1

May 22, 1962  A. RAGOSS ET AL  3,035,308
PRODUCTION OF GRAPHITIZABLE PITCH COKE AND GRAPHITE PRODUCTS
Filed Jan. 23, 1958  3 Sheets-Sheet 3

United States Patent Office 3,035,308
Patented May 22, 1962

3,035,308
PRODUCTION OF GRAPHITIZABLE PITCH COKE AND GRAPHITE PRODUCTS
Alfred Ragoss, Erich Fitzer, and Erich Nedopil, Meitingen, near Augsburg, and Anni Buhmann, Frankfurt am Main Griesheim, Germany, assignors to Siemens-Planiawerke A.G. fur Kohlefabrikate, Meitingen, near Augsburg, Germany, a corporation of Germany
Filed Jan. 23, 1958, Ser. No. 710,811
Claims priority, application Germany Jan. 24, 1957
23 Claims. (Cl. 18—54.7)

Our invention relates to the production of a graphitizable form of carbon and shaped graphite bodies made thereof.

According to conventional methods, shaped graphite bodies are industrially produced from coke in mixture with pitch serving as binding agent. The bodies shaped from the green mass by molding or extruding are first carbonized by baking and then graphitized by heating at temperatures above 2700° C. Not all types of coke and not all binding agents are suitable. The coke mainly used for high quality graphite, i.e. electrographite, is petroleum coke of low sulphur content and affords producing shaped graphite bodies whose specific gravity of 2.25 is close to the theoretical specific gravity of natural graphite, namely 2.26, as calculated from X-ray fine-structure investigations. The available quantities of good graphitizing, low-sulphur petroleum coke no longer suffice to meet the increasing demand for electrographite.

For producing shaped graphite bodies that are sufficiently strong mechanically but need not have particularly good electric conductivity, it is also known to use pitch coke obtained from mineral coal as raw material. Such coal pitch coke, compared with good graphitizing petroleum coke is much less suitable for graphitizing purposes. The specific gravities of shaped graphite bodies heretofore produced from coal pitch coke are about 2.21 to 2.22. The specific electric resistance is rarely below 10 ohm mm.$^2$/m. Coal pitch coke, therefore, has so far been significant as a raw material only for carbon anodes in aluminum electrolysis, which are not graphitized.

It is an object of our invention to afford producing a good graphitizable pitch coke from commercial coal tar and coal-tar pitch, so as to obtain a product suitable for the manufacture of high-quality shaped graphite bodies, particularly electrodes.

Another object of our invention is to reduce the graphitizing temperature required for optimum graphitization and optimum electric qualities of the shaped graphite products.

Still another object, akin to the one just mentioned, is to improve the economy of industrial graphite manufacture.

A further object of the invention is to devise a method of simultaneously producing batches of pitch coke from one and the same charge material but of different graphitizing properties.

According to one of the features of our invention, we use, as raw material for the pitch coke to be subsequently graphitized, a coal tar or coal pitch (both intended to be included in the expression "coal tar pitch") substantially free of sooty constituents as well as constituents that do not melt when the tar or pitch is being melted. Aside from the soot-like constituents, the non-meltable substances of which the raw coal tar pitch material must be free, are mainly high-molecular weight compounds of oxygen, sulphur or nitrogen. Using such a refined pitch, we subject the material to carbonization in accordance with the following conditions. We carbonize the material by thermally decomposing the pitch in its liquid phase while simultaneously drawing off the gaseous decomposition products, so that the pitch is carbonized into coke without passing through its vaporous phase. Such carbonization from liquid phase to the coke is effected by slowly baking the pitch at increasing temperature up to about 600° C. This obtained coke may be calcined in the usual manner at higher temperatures. More specifically, the coking by thermal decomposition of the pitch in the liquid phase mainly takes place in the range about 340° C.

We have found that a good graphitizing coke can be produced from coal tar or coal pitch only if the coke formation takes place from the liquid but not from the vaporous phase. Thermal decomposition of carbon compounds from the vaporous phase always results in fine-crystalline coke agglomerations which do not convert into large unitary graphite crystals during the subsequent high-temperature graphitizing treatment. In contrast, when the refined liquid pitch is carbonized under the conditions required by our invention, the resulting coke particles are readily converted into large good-conducting graphite crystals by the subsequent graphitizing treatment.

Our invention is described hereinafter with reference to the drawings in which.

Several methods of making pitch coke are known. Coking has been effected either in retorts or in multi-chamber ovens of ceramic material. In all these cases, the carbonizing conditions are not such as to exclude a thermal decomposition of the evolving vaporous constituents to occur simultaneously with the thermal decomposition of the liquid. According to our research results, the coke formed by thermal decomposition from the occluded gas bubbles seems to prevent the formation of a good graphitizable coke.

We have found that, for producing good graphitizing coke, the rate of temperature increase must be so slow as to require at least 14 hours for the temperature to pass through the range from 340 to 600° C., and that within the range of 340 to 550° C. the temperature increase must be less than about 20° C. per hour. Above 600° C. the rate of temperature increase is no longer critical.

The above-mentioned fundamental requirements of our invention point away from the past technological development of pitch-coking methods. Heretofore, it has been attempted to obtain largest possible yield of coke from a charge of pitch by blowing air or steam through the pitch prior to coking. We found that such treatment is particularly detrimental to the formation of good graphitizing coke. Furthermore, the past technological development proceeded from relatively slow coking in retorts to the now preferred very rapid coking in chamber ovens; but we also found that the more rapid chamber coking method likewise prevents the subsequent formation of good graphitizing coke. The theoretical explanations for the method according to the invention are not yet fully clarified. We assume that the conditions are similar to those involved in the breeding of large crystals from a super-saturated aqueous solution. The fewer crystal seeds are present at beginning crystallization, the larger are the resulting crystals. Furthermore, a smaller rate of cooling during crystallization promotes the growth of large faultless crystals. On the other hand, if a super-saturated solution is cooled very rapidly and is also seeded with many crystal germs, spontaneous crystallization takes place and an irregular mass of randomly oriented small crystals is obtained. During coke formation, the non-meltable, and mainly foreign-type constituents, act as crystal germs and thus prevent the formation of large, uniformly oriented carbon agglomerations. Our invention, therefore, is predicated upon the following essential features:

(1) Largest possible elimination of non-meltable crystal germs from the pitch to be carbonized, and (2) Gradual and slow heating of the pitch up to the coking temperature for securing the formation of large carbon agglomerations which are the only ones well capable of forming, to a sufficiently large extent, a graphite crystalline structure during the subsequent graphitizing treatment.

According to a further feature of our invention, we perform the coking of the pitch which, as mentioned, is free of non-liquefiable constituents, while excluding the presence of any agents that may give off steam and oxygen or sulphur. If such elements and compounds are present during carbonizing, they also act as undesired foreign-type crystal germs and thus promote the formation of badly graphitizing coke.

In contrast to undesired foreign-type germs, or germs resulting from spontaneous thermal decomposition or from decomposition from the gaseous phase, the presence of kindred-type, well-oriented germs during carbonization of the pitch is desirable. The phenomena relating to the formation of kindred germs from pitches used in accordance with the method of our invention, have been studied with the aid of a newly developed counting-chamber method. This method comprises diluting the pitch, prepared for coking, in anthracene oil or o-dichlor-benzol in the ratio 1:10, and counting the insoluble constituents in a counting chamber with a layer thickness of .025 mm. under the microscope at 150 times magnification as customary for blood tests. These studies, of which some results are shown in FIGS. 1 to 7, form the basis for another feature of the present invention, namely the application of a germ-forming treatment prior to the coking proper.

Figure 5:
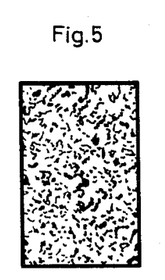
Figure 6:
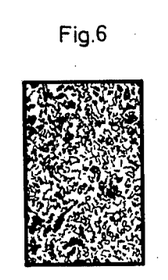
Figure 7:
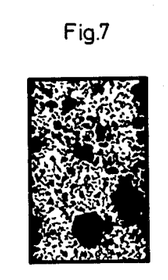

All ordinary and commercially available grades of pitch contain non-meltable constituents. If such a pitch is diluted as described above and then observed in the counting chamber, the soot-like constituents appear distributed as represented in FIG. 5. If the same pitch is subjected to tempering at 350° C. for one hour, then the product, diluted with o-dichlor-benzol as described, exhibits a distribution of the solids as represented in FIG. 6.

Figure 1:
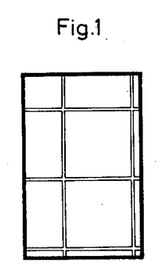
FIGS. 1 to 12 show respectively various coke textures as they appear under a microscope.
Figure 2:
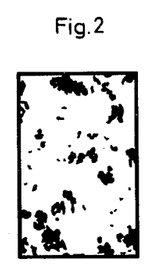

In contrast, when the pitch is free of soot-like constituents, as required by the present invention, the material diluted with o-dichlor-benzol appears under the microscope as shown in FIG. 1, where only a counting grid but no solid particles are visible. After tempering at 350° C. for one hour, there still is no formation of carbon-containing, non-melting constituents. If the tempering is continued for a total period of four hours, then insoluble constituents are formed as is apparent from FIG. 2. In comparison with the formation of sooty constituents according to FIG. 5, the appearance of the solids in FIG. 2 reveals the formation of area particles which form crystal germs beneficial to the desired coke formation. These area-shaped germs are particularly important for the production of good graphitizing coke because the planes of these crystallites are parallel to the planes of the graphite crystals to be formed subsequently, whereas no orientation of the graphite planes is possible in the promiscuously oriented crystal germs according to FIGS. 5 and 6.

Figure 3:
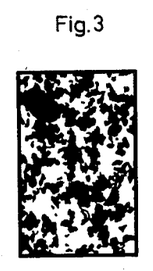
Figure 4:
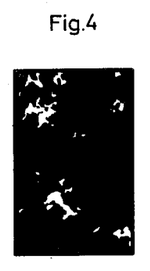

If the germ-forming treatment is intensified, for example by extending the heating at 350° C. to a total period of ten hours, then the occurrence of area-like enlargements of the primarily formed crystallites is observed as shown in FIG. 3. It is just this formation of carbon areas which, according to our findings, makes the pitch substance ideally suitable for good graphitizing coke. FIG. 4 shows a diluted specimen which was first provided with primary germs by subjecting it to a germ-forming treatment at 350° C. for five hours, and was subsequently subjected to slow temperature increase within ten hours up to 450° C. It is apparent that during the carbonizing treatment the carbon precipitated onto the primary germs.

However, if the starting material to be used according to the invention, namely a pitch free of soot-like constituents, is subjected to rapid heating up to approximately 400 or 500° C. without inserting the above-mentioned germ-forming period during which the temperature is kept at an intermediate value, then the coking takes place spontaneously and results in the formation of many small germs, thus preventing the occurrence of the desired large-area agglomerations beneficial to the subsequent graphitizing treatment. The result of such rapid heating is apparent from FIG. 7. A still finer distribution of badly graphitizing germs is obtained if the coking is carried out under such conditions as to cause the evolving volatile hydrocarbons to form occluded foam or bubbles which remain in the product during the carbonizing treatment. Pitch foams thus treated can no longer be dissolved and do not result in good graphite.

We have found that for reliably producing a good graphitizable coke, the thermal decomposition should be effected above 340° C. and that for promoting the formation of crystal germs a temperature-holding period above 340° C. should be observed prior to the coking proper. The temperature-holding period is preferably chosen in the range between 340 and 400° C. and we have found that the duration of this period must be at least three hours.

We have further found that the germ-forming period yields particularly favorable results if the heated substance is kept under super-atmospheric pressure during that period. This prevents the formation of vaporous compounds which can be thermally decomposed and can form soot-like constituents directly from the gaseous phase.

However, while the crystal-germ formation is thus preferably effected under positive pressure, it is particularly desirable to operate under normal atmospheric pressure or vacuum during the following coking proper. This has the effect of drawing off the decomposition products and thus preventing them from lingering in the temperature zone, which could readily lead to their thermal decomposition and the formation of badly graphitizing coke. Since the volatile substances are drawn off, particularly under vacuum, the bath of pitch then in carbonizing condition is to some extent given a macroscopic orientation and thereby also some degree of microscopic orientation. That is, a coke of great anisotropy is obtained. This will be further mentioned in a later place.

As explained, the production of good graphitizing pitch coke according to the invention makes it necessary to use as starting material a tar or pitch free of non-meltable substances mainly consisting of compounds of oxygen, sulphur and nitrogen. The normal commercial tars and pitches as well as those resulting as by-product from various industrial processes normally contain varying amounts of such constituents. It is, therefore, another object of our invention to produce from such commercial coal tars and coal pitches a pitch coke which possesses the above-mentioned properties and thus is suitable for the manufacture of shaped graphite bodies, particularly electrodes.

To this end, and in accordance with another feature of our invention, we first subject the commercial coal tar or coal pitch to an extraction process by means of which the non-liquefiable constituents—mainly compounds of oxygen, sulphur and nitrogen—are segregated by dissolution or melting, whereafter the remaining pitch, now liberated from the non-liquefiable constituents, is carbonized to product the coke. The pitch thus pre-treated can readily be converted into coke, and this coke is very well suitable for graphitizing, so that the graphitizing treatment can be performed at temperatures below 2650° C. The low graphitizing temperature, compared with the graphitizing temperature above 2700° C. required for good petroleum coke, is tantamount to considerable saving in power required for graphitizing.

This confirms the above-mentioned recognition that the badly graphitizable constituents consist mainly in compounds that contain oxygen, sulphur or nitrogen. These compounds, in most cases, are heterocyclical, whereas high-molecular weight constituents free of oxygen, sulphur and nitrogen can very well be graphitized after coking.

This is the reason why the invention requires removing from the raw material the predominantly heterocyclical compounds of oxygen, sulphur or nitrogen. The segregation of these detrimental constituents from the pitch can be effected, for instance, by dissolving the pitch in organic pitch-dissolving agents such as benzol, toluol, chlorbenzol, dichlorbenzol, anthracene oil, pyridine, chinoline and like solvents. The individual solvents exhibit respectively different dissolving abilities. From analytical work concerning the segregation of pitch into low-molecular and high-molecular weight constituents, it is known that chinoline possesses the strongest dissolving ability. In the method according to our invention, chinoline is less suitable because it also possesses good dissolving ability for the heterocyclical compounds detrimental to graphitizing, so that these undesired compounds may enter into the pitch to be subsequently carbonized into coke. On the other hand, we found chlorinated benzols particularly suitable as solvents for the purpose of the invention.

The separation of the insoluble constituents of the liquefied pitch can be effected by filtering, settling, centrifugating or other expedients known for such purposes.

Described in the following are examples of coal tar pitches which were processed with different solvents and resulted in respectively different insoluble residues liberated from the pitch to be subsequently carbonized. The results tabulated below indicate the values of the coke products relative to specific gravity, and sulphur content before and after graphitizing.

EXAMPLE 1

Pitch from city-gas production was used. It had the following properties:

Softening point (according to Kraemer-Sarnow) ° C__ 63
Residue on carbonization (according to Radmacher) percent__ 26.71
Solvent-fractionation (according to Mallison):
    H-resins do____ 3.31
    M-resins do____ 21.58
    N-resins do____ 23.59
    m-oils do____ 25.14
    n-oils do____ 26.38

This pitch was extracted in respectively different batches by means of the solvents listed in Table 1, and the tabulated amounts of insoluble residue were found:

Table 1

| No. | Solvent | Insoluble residue, percent |
|---|---|---|
| 1 | Light oil 83°–256° C. boiling limit | 5 |
| 2 | Pyridine | 3.3 |
| 3 | Trichlorethylene | 7.75 |
| 4 | Furfural | 4 |

The respective batches of pitch, liberated from the insoluble residues mentioned in the last column of Table 1, were each divided into two portions. One portion was carbonized in a ring-furnace lined with ceramic refractory, and the other portion was carbonized in a platinum crucible. The carbonization in the ring-furnace was effected by slow heating at increasing temperatures at a rate of 5° C. per hour up to about 600° C. Thereafter the temperature was further increased to approximately 1300° C. at a faster rate of heating (about 40° C. per hour). Thereafter the product was allowed to cool. A part of these coke-products was furthermore graphitized in a laboratory tube-furnace at 2600° C.

The same tests were performed with untreated pitch identical with the raw material used for the other tests. Another series of tests was made with the extracted insoluble residues. The results are reported in the following Table 2. Specimens Nos. 5 to 8 were the batches of pitch from which the insoluble constituents (specimens 1 to 4 in Table 1) were previously liberated as described above. Specimen 9 was the untreated raw pitch. Specimens 5a to 8a consisted of the insoluble residues extracted from the raw material from which the specimens 5 to 8 respectively were derived. Tabulated are the coke residue in percent by weight obtained from the respective specimens after coking, the specific gravity after coking at 1300° C. in the ring-furnace and the sulphur content of the specimens prior to the graphitizing treatment, and also the specific gravity and sulphur content after the specimens were subsequently graphitized at 2600° C.

Table 2

| No. | Extract obtained with | Coke amount in percent weight | | Coke spec. gravity | S in percent | Graphitized at 2600° C. | |
|---|---|---|---|---|---|---|---|
| | | In ring oven | In pt crucible | | | Spec. gravity | S in percent |
| 5 | Light oil | 38.6 | 26.9 | 2.092 | 0.50 | 2.254 | 0.03 |
| 6 | Pyridine | 54.4 | 29.3 | 2.138 | 0.50 | 2.256 | 0.02 |
| 7 | Trichlorethylene | 48.0 | 24.1 | 2.118 | 0.53 | 2.254 | 0.01 |
| 8 | Furfural | 51.4 | 25.8 | 2.139 | 0.42 | 2.259 | 0.003 |
| 9 | Untreated pitch | 59.9 | 40.9 | 2.101 | 0.56 | 2.222 | 0.03 |
| | Insoluble residue obtained with | | | | | | |
| 5a | Light oil | 87.2 | 85.14 | 1.766 | 1.22 | 1.902 | 0.09 |
| 6a | Pyridine | 91.9 | 91.7 | 1.853 | 0.83 | 1.989 | 0.06 |
| 7a | Trichlorethylene | 83.8 | 69.9 | 1.704 | 0.79 | 1.862 | 0.02 |
| 8a | Furfural | 87.3 | 87.0 | 1.768 | 1.10 | 1.893 | 0.04 |

As apparent from Table 2, the insoluble residues (specimens 5a to 8a), containing the constituents of the raw material (specimen No. 9) that do not melt at the carbonizing temperature and may form foreign-type crystal germs, do not form useful graphite, their specific gravity after graphitizing being below that of the untreated pitch (specimen No. 9). In contrast, the treated pitches (specimens Nos. 5 to 8) graphitize much better than the untreated pitch (specimen No. 9) as is apparent from the fact that the specific gravities of the graphitized specimens is higher than that of the untreated pitch (specimen No. 9) and approaches the gravity of natural graphite (2.26). Notable in this respect is specimen No. 8 which has virtually the same specific gravity as natural graphite and a smaller sulphur content than all other specimens tested.

The following would be a successful example for the technical treatment of the above mentioned pitch: The gaswork tarpitch remaining in the vacuum-distillation as residue at a temperature of 330° C. and a softening point of 63° C. will be put into a closed tank together with the quadruple quantity of pyridine and will be dissolved within one hour under stirring at a temperature of 100–120° C. Then it is filtered through filter cloths reinforced by glass fibres, on a vacuum filter apparatus. The residue of approximately 4% (of the pitch) still wet with pyridine, remaining on the filter will be mixed into that tar-pitch portion which is meant to be used in the manufacture of badly graphitizing coke.

The pyridine contained in the filtrate is removed by distillation at reduced pressure up to a temperature of 150° C. The resulting solvent-free residue is the sootless coal-tarpitch, free of constituents nonliquefiable by the subsequent melting of the pitch. It is heated up to a temperature of 350° C. under the same reduced pressure and thereafter $CO_2$ is introduced to raise the pressure to the value of one atmosphere. Now the temperature of 350° C. is being maintained for 7 hours. Thereafter the pressure is once more slightly reduced (to about 740–750 mm. Hg) and the temperature is raised at a rate of 15° C. per hour up to 600° C. Then, the calcination of the formed coke is carried out up to a temperature of 1300° C. in the usual calcination-furnaces.

EXAMPLE 2

A coal tarpitch with the following specified properties was used:

Softening point (according to Kraemer-Sarnow) ° C__ 74
Residue on carbonization (according to Radmacher) __________________________ percent__ 37
Solvent-fractionation (according to Mallison):
   H-resins ________________________ percent__ 9.17
   M-resins ______________________________do____ 24.65
   N-resins _______________________________do____ 25.28
   m-oils _________________________________do____ 24.21
   n-oils __________________________________do____ 16.69

This pitch was hot-extracted with benzene. An insoluble residue in the amount of 26.8% by weight was obtained. The treated pitch was carbonized in a ring-furnace in the same manner as described in Example 1 and then graphitized at 2600° C. The same treatment was applied to a batch of the untreated pitch used as raw material, and also to the insoluble residues. The results, indicating the amount of coke residue, specific gravity and sulphur content prior to graphitizing and specific gravity and sulphur content after graphitizing are listed in Table 3.

*Table 3*

| No. | Specimen | Coke amount in percent | Coke spec. gravity | 1300° C. S in percent | Graphitized | |
|---|---|---|---|---|---|---|
| | | | | | spec. gravity | S in percent |
| 10 | Benzene extract. | 46 | 2.107 | 0.29 | 2.247 | 0.03 |
| 11 | Untreated pitch. | 51.75 | 2.085 | 0.62 | 2.208 | 0.08 |
| 12 | Benzene-insoluble residue. | 83 | 2.025 | 0.85 | 2.146 | 0.09 |

It is again apparent that the pitch treated in accordance with our invention (specimen No. 10) resulted in a graphitized product whose specific gravity approached that of natural graphite much more closely than the untreated pitch (specimen No. 11) subjected to the same treatment, and that the insoluble residue (specimen No. 12) was greatly inferior in this respect even in comparison with the untreated pitch.

The following is an example of how to produce well graphitizing coke from the above described coal-tar pitch:

The extraction is performed by dissolving the pitch in a quintuple quantity of benzene. For the dissolving process a closed tank with double walls will render good service, heated to a temperature of 80° C. by means of hot water, and with a reflux-condenser. The dissolving process is discontinuous and for 100 kg. of comminuted pitch terminated in 30 minutes. The content of the dissolving tank will be cooled to room temperature in closed cooling bags easily to be cleaned. The separation from the insoluble residue is performed in a continuous screening-centrifuge. The filtrate contains approx. 75% of the coal-tar pitch used, and is separated from the benzene by distillation. For that purpose the reflux-condenser on the dissolving tank may be used for the condensing of the benzene vapours. Thus the recovered benzene is directly fed back into the dissolving tank. The coking of the pitch is performed in a chamber as described hereinbelow.

EXAMPLE 3

The following is a description of a particularly economical method to produce good graphitizing pitch-coke: From normal vertical coking-chamber for coal the volatile substances are passed through a tube into the condensate collection line, wetted and cooled by water and are then subjected to filtration. The filtrate is passed to a settling tank and there separates in three layers:

The bottom consists of a suspension of solids in tar, which have passed the coarse filtration-process. The medium layer contains the desired tar free of insoluble constituents. The top layer is formed by water and light oils. The pure tar-layer is characterized by the following typical data:

Percent
Residue on carbonization (according to Radmacher) _________________________________ 17.98
Water ___________________________________ 8.4
Sulphur _________________________________ 0.13
Boiling fractionation (according to Kraemer-Spilker):
   Boiling under 170° C. ________________ 7.72
   Boiling at 170–230° C. _______________ 10.15
   Boiling at 230–270° C. _______________ 7.30
   Boiling at 270–310° C. _______________ 5.00
   Boiling at 310–360° C. _______________ 19.48
   Boiling above 360° C. (including non-volatiles) ______________________________ 50.01

This tar-layer is now subjected to distillation under slight vacuum at a temperature of 330° C. The residues of this distillation are passed to the pitch-coking chamber and are carbonized according to the invention as described on the pages 8 and 9. This is done directly without a preceding blowing-process (air or steam), which has been usual up to this date in order to increase to softening-points as well as the coke yield of the pitch. According to our invention this said blowing-process must be left off on purpose, in order to obtain the desired good graphitizing coke. The yield of the coking process according to invention amounts to 35–50% as compared with a yield of 65% with blown hard pitches, obtained up to now. The larger quantities of volatile substances will be condensed and will undergo another distillation.

Figure 8:
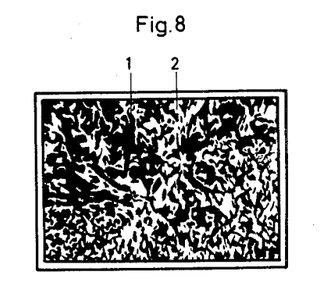
Figure 9:
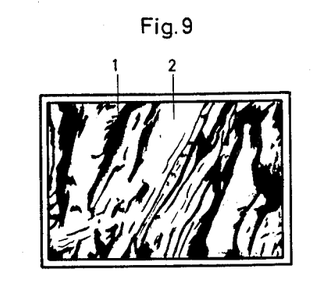
Figure 10:
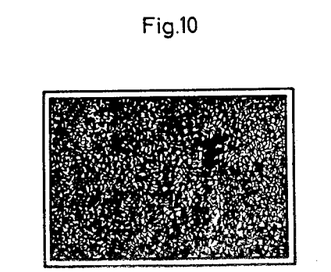

The graphitizing ability of a coke is also apparent from its texture under the microscope. For example, the drawing illustrates three textures at 300 times magnification of the following different cokes:

FIG. 8 represents the coke structure of a carbonized soft pitch (softening point 52° C.).

FIG. 9 shows the texture of pitch coke made according to the invention from the pitch constituents soluble in benzene.

FIG. 10 shows the texture of coke made from the insoluble residue resulting from the application of the method according to the invention to the coal-tar pitch.

As known, large band areas of uniform anisotropy indicate good graphitizing ability of the coke. In FIGS. 8 and 9, the pores are denoted by 1 and the banded areas of uniform anisotropy by 2. In FIG. 10, these areas 2 are too small to be optically dissolved at 300 times magnification. The figures show that the coke according to FIG. 9 (made in accordance with our invention) exhibits the largest areas of uniform anisotropy. That is, the texture, prior to graphitizing, already possesses the tendency of forming the graphite crystal lattice in preferred orientation.

The segregation of the non-liquefiable constituents may also be effected by melting and centrifugating, especially when soft pitch is used as raw material. This method is particularly successful if the molten pitch is mixed with a small amount of anthracene oil for reducing the viscosity of the melt. However, better and more reliable yields are obtained by the afore-described solvent method. Depending upon solvent and separating method used, the amount of segregated heterocyclical compound is 5 to 20%. This residue is suitable for the production of so-called amorphous, non-graphitized synthetic carbon bodies and can also be used as a binding agent or, when in coked condition, as solid material for amorphous synthetic carbon bodies.

While in the above-described examples the starting material used in the method according to the invention is pitch, i.e. a vacuum-distillation product obtained from tar, the invention may also be employed when using raw tar as starting material. For this purpose, and in accordance with another feature of our invention, the tar is first liberated from its constituents that are volatile at 340° C., in a manner similar to conventional tar distillation methods. The distillation residue, liberated from the just-mentioned volatile constituents, is further to be liberated from solid constituents, that is those that are not liquefiable at 340° C. The separation of these non-liquefiable constituents is effected, either prior or subsequent to fractionating-off the volatile constituents, by settling, filtering or other separation methods known for such purposes.

We have found that the method according to the invention for the production of good graphitizing coke can be performed with particularly good economy by first eliminating the constituents non-liquefiable at 340° C., and subsequently separating the constituents that are volatile at 340° C. It is preferable for this purpose to dilute the coal tar by liquids boiling below 340° C. in order to facilitate separating the solid phase from the liquid phase. This added liquid admixes itself to the constituents liquefiable up to 340° C. but does not dissolve the soot-like constituents.

Suitable as such diluting liquids are mainly liquid tar distillation products with a boiling point below 340° C., preferably below 200° C. The admixture reduces the viscosity of the tar and facilitates the separation of the solid constituents by conventional methods such as filtration and centrifugation.

Analogously, such liquid tar distillation products are also suitable as solvent for the pitches. In this case, too, the solid, non-liquefiable constituents are not dissolved by the solvent, whereas the compounds which during carbonization result in good graphitizable coke enter into solution.

After separating the solid constituents, the compounds contained in the tar and having a boiling point below 340° C. are driven off by careful distillation. The fractional distillation must be so conducted that no coke will form in the distilling retort during evaporation of the volatile constituents, and the distillation residue consists only of a liquid phase.

The possibility of producing a markedly anisotropic coke has already been mentioned. However, our invention also comprises a method step that affords obtaining a good isotropic coke which nevertheless has good graphitizing qualities.

We have found that such a good graphitizing pitch coke is obtained if the thermal decomposition of the liquid-phase pitch takes place during the crystal-germ forming period under a column or layer of liquid, i.e. a liquid phase suitable for thermal decomposition. This not only permits operating at slight superatmospheric pressure, but also has the effect of continuously closing any hollow spaces that result from the formation of volatile compounds and would not otherwise close in the highly viscous and partly already solidified substance, such continuous filling and closing of hollow spaces being due to the ingress of the new liquid phase to be carbonized. It must be prevented, however, that the filling of the hollow spaces, forming themselves during carbonization, occurs at excessively high temperatures because this may result in spontaneous coking and formation of soot-like substances.

Figure 12:
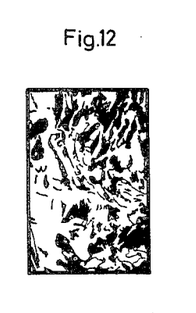

The type of coke thus obtained possesses a preferred crystallographic orientation within the individual grains of coke. The texture of such a coke is illustrated in FIG. 12, 150 times magnified. It exhibits banded areas of uniform anisotropy which, however, are bunched together. Accordingly, when grinding the coke to dust particles, the individual coke grains are not split into scale-shaped particles but have rounded or spherical shape and, summarily, crystallographically isotropic properties.

It has been mentioned that when carbonizing under vacuum, the resulting coke may have augmented crystallographic anisotropy. Such a crystallographic character can also be obtained by causing the carbonizing liquid to continuously flow into progressively cooler zones in which the coking of the liquid skins enveloping the gas bubbles is prevented.

Figure 11:
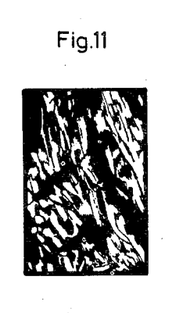

A coke produced in accordance with the latter method has a texture as exemplified in FIG. 11. It exhibits a typical formation of band areas of uniform anisotropy. Grinding of this coke results in scale-shaped granules.

When such a grain is pressed in a die or by extrusion, a preferred orientation of the shaped carbon body is obtained. This is manifested by a pronounced discrepancy in physical properties in the respective directions vertical and parallel to the pressing direction. X-ray tests have shown that this optically visible anisotropy of the coke grain can also be confirmed roentgenographically. More specifically, it has been found that the basis planes of the hexagonal graphite crystals are oriented parallel to the banded areas so that the direction vertical to the band planes represents the c-direction of the graphite crystals. This knowledge has been found very useful for forming graphite bodies of specific physical properties. That is, by selectively using die-pressing and extrusion-pressing, the preferred orientation can be obtained in one or the other direction.

Cokes made according to this method, after being calcined at 1300° C., have a specific gravity of 2.110. After heating the coke up to 2700° C. within a short period of time, a specific gravity 2.25 was determined, which is sufficiently close to the gravity 2.26 of natural graphite. Hence, ordinary commercial coal pitch can indeed be used for producing a good graphitizing coke approaching or even excelling the best available graphitizable petroleum cokes.

We have observed that the materials in which the material is subjected to coking may have a detrimental effect upon the resulting coke. We have found particularly that the coking will reliably result in good graphitizable coke if coking vessels free of heavy metal or heavy-metal oxides are used.

Since the conventional methods of producing coal pitch coke aim at largest possible yield of coke from the starting charge of pitch, it has heretofore been advantageous to use a pitch of high coke content, whereas, when testing the pitch for suitability, the amount of so-called soot-like constituents was not relevant. Generally, a high content of such constituents was desired because they increase the yield of coke and act as seeds to promote coking.

As explained above, we have found that soot-like constituents, when contained in the pitch being carbonized, result in coke of poor graphitizing properties, and we also ascertained that the coke which forms around these constituents—acting as crystal seeds—also graphitizes very poorly.

As will be recognized from the foregoing, the liquid phase to be subjected to thermal decomposition in accordance with our invention does not, generally, represent a pitch in the commercially customary sense. For that reason, we designate the resulting coke, thermally treated up to 550 or 600° C., as tar semi-coke or pitch semi-coke for distinction from the usual pitch coke.

The semi-coke from tar or pitch made according to the invention can be subjected to calcination (heating at incandescent temperature) in the same manner as petroleum semi-coke. The calcination product, directly applicable in the synthetic carbon industry, then represents the good graphitizable pitch coke and differs from commercial pitch coke by superior graphitizing ability at lower temperatures than those used in the conventional graphitizing treatment of petroleum coke.

As mentioned, the reduced graphitizing temperature applicable by virtue of the invention is of advantage for power economical reasons. A further improvement from this viewpoint is obtained, according to another feature of our invention, by combining the above-described method with the simultaneous production of coke from normal coal pitch that contains many insoluble constituents and thus results in badly graphitizable coke which, however, is particularly suitable for Soderberg masses and carbon electrodes. Accordingly, we produce the good graphitizing pitch coke (I) and the poorly graphitizing pitch coke (II) in one and the same carbonizing vessel but in portioned-off chambers that are heated from the same source of heat. For producing the pitch coke II, we use a pitch to which, if desired, high-molecular weight, insoluble constituents and soot-like substances are added, preferably those substances which are obtained as undesired residue when refining the pitch for the production of the coke I in accordance with the methods of the invention described earlier in this specification. The carbonizing chamber for the production of pitch coke II is adjacent to the source of heat, whereas the carbonization of pitch coke I is effected indirectly by heat supplied from the carbonizing chamber for coke II. According to another feature of the simultaneous coking method, we provide a chamber for coke I between two chambers of the same volume for coke II. In this case the quantity of the resulting pitch coke II is approximately twice as large as that of pitch coke I.

The twin method is preferably carried out in a slot-type oven in which each individual coking chamber is heated from the outside and subdivided by partitions extending parallel to the fire walls. Consequently, the lateral slot spaces formed by the partitions are heated to a higher temperature than the middle space so that the coking of the charge takes place more rapidly and at higher temperature in the lateral spaces than in the middle space which receives heat only from the lateral spaces.

Figure 13:
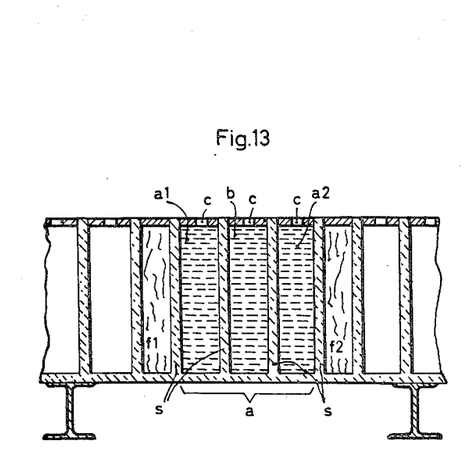
FIG. 13 shows schematically and in cross section a coke oven for performing a method according to the invention.

An example of the method will be described presently with reference to FIG. 13 of the drawing showing schematically a coke oven battery of the slot type. The coke chamber "$a$" is heated on both sides from gas-heated flues $f1$ and $f2$ and is subdivided by partitions $s$ into three spaces $a1$, $b$, $a2$ all of the same cross section. The coking chamber $a$ is charged with coal tar through inlet openings $c$ in the roof of the coking chamber in the usual manner. The partitions $s$ as well as the lateral wall of the coking chamber consist of refractory masonry. When heating the coking chamber by fire gases in flues $f1$ and $f2$, the lateral spaces $a1$ and $a2$ are first heated up to the temperature required for relatively rapid carbonization of the pitch located in spaces $a1$ and $a2$. During the carbonizing period, the pitch in space $b$ is likewise heated and is carbonized at a lower temperature than the pitch in the lateral spaces $a1$ and $a2$.

Consequently, when the coking of the pitch charge is completed, there is located in the lateral spaces $a1$, $a2$ a denser, badly graphitizing pitch coke, whereas a good graphitizing pitch coke is produced in the middle space $b$ although the starting material was the same in all three spaces. After opening the oven covers at the front walls of the coking spaces, the ram of the pusher machine first ejects the coke from the lateral spaces $a1$ and $a2$, whereafter the ram is applied to the middle space $b$. As mentioned, the spaces $a1$, $b$, $a2$ have the same cross section so that one and the same ram of the pusher machine can sequentially be used for emptying all three spaces. If desired, of course, the middle space $b$ may be charged with a starting material different from that charged into the lateral spaces $a1$ and $a2$. For facilitating the charging of the coking chamber, the charge may be introduced only through the opening $c$ of the middle space $b$, provided the partitions have openings through which the charge of pitch may also enter into the lateral spaces. These openings in the partitions must be so arranged that, after coking of the pitch charge, any coke residue may be eliminated from the openings with the aid of suitable cleaning tools.

A similar method and similar devices may also be used in conjunction with different coke ovens. For example, the multiple carbonizing operation may also be performed with the aid of devices usually employed for the production of pitch coke. Thus the coking of the pitch may be effected centrally within a retort. In this case, a smaller retort is mounted within the normal coking retort, and the refined starting material previously liberated from solid constituents is charged into the inner retort, whereas the interspace between inner and outer retort is charged with normal pitch which, if desired, may be enriched with acidic components. Carbonization is effected by heating the twin-retort from the outside so that the refined pitch located in the inner retort is heated indirectly through the surrounding jacket of raw pitch.

An analogous operation is possible with a shaft-type coking oven. In this case, the shaft comprises two concentric spaces comparable, in principle, to two concentric pipes. The inner pipe is charged with the pre-treated pitch which is liberated from soot-like and other undesired compounds, and the interspace between inner and outer pipe is charged with the pitch rich in soot-like constituents. Heating by fire gases is applied from the outside, and the refined pitch located in the inner pipe is heated indirectly through the surrounding jacket of raw pitch.

Regardless of the particular carbonizing method used for the purposes of our invention, the use of the so-called anti-foaming agents should be avoided. In modern pitch-coking plants, secondary condensate oils are intentionally added to serve as anti-foaming agents. These agents cause a very rapid formation of foreign-type carbon seeds which form coking centers for the pitch. Such carbon seeds are very detrimental to obtaining a pitch coke I of good graphitizing properties. Well suitable, however, is the use of such anti-foaming agents for the production of the pitch coke II to be used for the manufacture of Soderberg and hard-burning electrode carbons. The carbonization of coke II can be effected rapidly and occurs the more rapid the more soot-like constituents and anti-foaming agents are added.

As mentioned, pitch coke made of refined tar or pitch in accordance with the present invention is particularly suitable for the manufacture of shaped graphite bodies for electrical purposes (electrographite). Whereas prior methods of producing electrographites, for instance from petroleum coke, required graphitizing at a minimum temperature of 2700° C., we have surprisingly found that shaped bodies made of pitch cokes according to the invention achieve the optimum of electric conductance already after being heated to a temperature of about 2600° to about 2650° C. Further heating does not increase electric conductance if substantially no poorly graphitizable constituents are present in the shaped body, but may reduce the mechanical strength of the product. In some cases the possibility of graphitizing at temperatures below 2700° C. for producing good conducting electrodes of pitch coke amounted to a saving in power of approximately 10% during the graphitizing treatment. This more than compensated for the increased power required for preparing the pitch.

Pitch coke made according to the invention is suitable for the manufacture of shaped graphite electrodes, particularly of large diameter, which contain such coke as solid constituent in an amount of at least 50% by weight, aside from such other carbonaceous solid substances as calcined coke, sulphur-poor petroleum coke or the like. However, the best values of electrical and thermal conductivity together with slight thermal expansion are obtained with electrodes whose solid constituent consists essentially only of the coke produced according to the invention, because the petroleum cokes available today possess, in most cases, a sulphur content above 0.5%.

An example relating to the use of pitch coke according to the invention for the production of shaped electrodes is represented in Table No. 4. All of the tabulated four specimens of electrodes consisted of fine granular mixtures in which 25% of the solid constituents had a grain size larger than .09 mm. 100 parts of solid matter were mixed with 30 parts of commercial tar-pitch mixture (softening point 68° C.) as usually employed for such purposes. All tabulated values relate to a graphitizing treatment of only 2600° C.

Table 4

| No. | Solid | Volumetric weight | Specific gravity | Longitudinal resistance in ohm mm.²/m. |
|---|---|---|---|---|
| 13 | Petrol coke Beaumont (1.3% S). | 1.550 | 2.201 | 10.4 |
| 14 | Petrol coke Tidewater (.55% S). | 1.560 | 2.221 | 9.2 |
| 15 | Non-extracted coal pitch coke. | 1.595 | 2.189 | 11.5 |
| 16 | Refined coal pitch coke. | 1.565 | 2.237 | 8.0 |

Specimens Nos. 13 and 14 were made from petroleum coke available under the trade designations given in the table. Specimen No. 15 was made from unrefined coal pitch coke and was produced in accordance with the method used in the foregoing Example No. 2 for specimen No. 11 in Table 3 except that, as mentioned, an amount of 30 parts of tar-pitch mixture was admixed to 100 parts pitch like in all other specimens listed in Table 4. Consequently, only specimen No. 16 in Table 4 was made from coal-tar pitch processed in accordance with our invention and corresponding essentially to specimen No. 10 in Table 3 except for the mentioned admixture of tar-pitch mixture as binding agent.

As is apparent from Table 4, the specimen No. 16 is not only a marked improvement over specimen No. 15 made from non-refined coke, but also approaches natural graphite much more closely than specimens Nos. 13 and 14 made from petroleum coke. That is, the specific gravity of specimen No. 16 is higher and the electric resistance lower than that of the other specimens tabulated for comparison.

Optimum electric and thermal conductance as well as elasticity in shaped graphite bodies are obtained if a binding agent is used that consists of coal-tar pitch liberated from non-liquefiable constituents in accordance with the method of our invention as described above in this specification. The use of such refined coal-tar pitches as a binding agent in molded graphite bodies somewhat aggravates the firing conditions, this being the reason for the fact that the artificial carbon industry has gone in the opposite direction in exclusively using good coking pitches as such binding agents. By liberating the coal-tar pitch from non-liquefiable constituents in accordance with our invention, these low-molecular weight pitches are advantageously applicable as binding agents, with the surprising result that a further reduction in electrical resistance by about 20% can be obtained. When using pitch coke made according to the invention together with an admixture of binding agent consisting of pitches also refined according to the invention, but not pre-coked, the final resistance values of the shaped graphite bodies after graphitizing are between about 6 and 6.5 ohm mm.²/m. This improvement is exemplified by the measured values tabulated in Table 5 and obtained by using as a binding agent a pitch refined in accordance with the invention. In the three tabulated specimens, the shaped graphite body was formed from fine granular mixtures of Roumanian petroleum coke (0.5% S) in which 30% of the solid matter had a grain size larger than .006 mm.; and in each case a binding agent was added in an amount of 43.7 parts to 100 parts of solid matter. In all three cases, the bodies were graphitized at 2850° C. The only difference between the specimens was the kind of binding agent used.

Table 5

| No. | Binding agent | Volumetric weight | Specific gravity | Longitudinal resistance in ohm mm.²/m. |
|---|---|---|---|---|
| 17 | Horizontal-retort tar pitch. | 1.60 | 2.220 | 8.1 |
| 18 | Pitch 75° S.P. | 1.545 | 2.225 | 7.5 |
| 19 | Refined pitch extracted from Spec. 18. | 1.540 | 2.235 | 6.6 |

These shaped graphite bodies, although of excellent electric conductivity, have slightly lower density than the usual known molded graphite bodies; but this is an advantage where shaped bodies of highest elasticity are required as is the case for electrodes of large diameters such as 550 and 600 mm. The increased elasticity permits reducing thermal tensions to a minimum. The electrode consumption per ton of steel is thus considerably reduced.

In the manufacture of shaped graphite bodies, the pitch processed in accordance with our invention is suitable not only as solid matter in coked condition and/or as binding agent, but it may also be used as an impregnating medium for the purpose of producing good conducting graphite bodies of increased density. By virtue of its excellent graphitizing ability, this impregnating medium, when penetrated into the pores of the molded body, and subsequently graphitized in that body, fills the voids with graphite so as to increase the volumetric weight, whereby an excellent electrical and thermal conductivity is obtained while avoiding the increased brittleness of the shaped graphite bodies otherwise accompanying the impregnation. This is so because the well-graphitized residue of the impregnating medium according to the invention is soft and readily deformable.

An essential advantage of our invention is the reduction of graphitizing costs. The bodies can be graphitized at temperatures below 2650° C. The minimum temperature of the graphitizing treatment should be 2400° C. and is preferably not less than 2500° C.

We claim:
1. The method of transforming coal tar and coal tar pitch into a readily graphitizable pitch coke and the manufacture from the latter of electrically good conducting graphite electrodes, which comprises separating from the raw material all sooty and other constituents nonmeltable below a temperature of 340° C. and insoluble in acid-free organic pitch-dissolving agents, said constituents being predominantly heterocyclical compounds of oxygen, sulphur and nitrogen, coking the thus refined molten coal tar pitch from its liquid phase by slowly heating it from 340° C. to 600° C. during a period of at least 14 hours, continuously removing the gaseous dissociation products evolved from the material during said coking period, comminuting and fabricating the resulting pitch coke product into shaped electrode bodies, and heating the shaped bodies to an incandescent temperature to graphitize the material therein.

2. Method according to claim 1, further defined in that during said coking step the rate of heating up of the refined coal tar pitch in the temperature range portion from 340° to 550° C. is less than 20° C. per hour.

3. Method according to claim 1, said coking step being carried out in an atmosphere free of substances capable of evolving any one of steam, oxygen and sulphur.

4. Method according to claim 1, further defined in that the temperature during said coking step is maintained between 340° C. and 400° C. for an interval of at least a three-hour portion of said slow heating period to promote coke seed formation.

5. Method according to claim 1, further defined in that the temperature during said coking step is maintained between 340° C. and 400° C. for an interval of at least 3 hours to promote coke seed formation, and said refined coal tar pitch is maintained at super-atmospheric pressure during said seed formation interval.

6. Method according to claim 5, wherein said refined coal tar pitch is maintained under pressure not greater than atmospheric during the portion of said coking period subsequent to said seed formation interval.

7. The method of transforming coal tar and coal tar pitch into a readily graphitizable pitch coke and the manufacture from the latter of electrically good conducting graphite electrodes, which comprises separating from a sootless coal tar pitch all constituents non-meltable at temperatures up to 340° C. and insoluble in organic pitch-dissolving agents free from organic acids, coking the thus purified molten coal tar pitch from its liquid phase by heating it from 340° C. to 600° C. during a period of at least 14 hours, continuously removing the gaseous dissociation products evolving from the material during said coking period, comminuting the resulting pitch coke product, adding a binder, fabricating the product into shaped electrode bodies, and heating the shaped bodies at a temperature of 2400° to 2650° C. to graphitize the material therein.

8. Method according to claim 7, said step of eliminating constituents comprising subjecting said sootless coal tar pitch to an extraction process with a solvent selected from the group consisting of benzol, toluol, chlorbenzol, dichlorbenzol, anthracene oil, pyridin, chinolin, trichlorethylene, and furfural.

9. The method of transforming coal tar and coal tar pitch into a readily graphitizable pitch coke and the manufacture from the latter of electrically good conducting graphite electrodes, which comprises subjecting to an extracting process a sootless coal tar pitch to eliminate therefrom all constituents non-meltable below 340° C. and insoluble in an organic pitch-dissolving agent free from organic acids and selected from the group consisting of benzol, toluol, chlorbenzol, dichlorbenzol, anthracene oil, pyridin, chinolin, trichlorethylene, and furfural, heating the product to about 340° C. and distilling off said pitch-dissolving agent, separating the non-dissolved and non-melted constituents from the liquid pitch, coking the thus purified coal tar pitch from its liquid phase by heating it from 340° C. to 600° C. during a period of at least 14 hours, continuously removing the gaseous dissociation products evolving from the material during the last-named coking step, comminuting the resulting pitch coke product, adding a binder, fabricating the product into shaped electrode bodies, and heating the shaped bodies at a temperature of 2400° to 2650° C. to graphitize the material therein.

10. The method of transforming coal tar and coal tar pitch into a readily graphitizable pitch coke and the manufacture from the latter of electrically good conducting graphite electrodes, which comprises the steps of diluting the raw material in an organic pitch-dissolving solvent free from organic acid and having a boiling point below 340° C. and extracting from the solution the constituents non-liquifiable up to 340° C., subjecting the resulting pre-refined pitch to fractional distillation and thereby removing the constituents volatile at temperatures up to 340° C., thereafter coking the resulting refined pitch from its liquid phase by slowly heating it from 340° C. to 600° C. during a period of at least 14 hours, continuously removing the gaseous dissociation products evolved from the material during said coking period, comminuting the resulting pitch coke product, adding a binder, fabricating the product into shaped electrode bodies, and heating the shaped bodies to a temperature of 2400° C. to 2650° C. to graphitize the material therein.

11. The method according to claim 4, further defined in that the material being carbonized into coke is maintained at least during said coke-seed forming interval under a liquid column consisting essentially of said refined pitch.

12. The method of producing readily graphitizable pitch coke and the manufacture therefrom of shaped graphite bodies, which comprises using a refined sootless coal tar pitch free of constituents non-liquifiable by the subsequent melting of the pitch in a melting point range up to 340° C., said constituents being mainly high-molecular weight compounds of oxygen, sulphur and nitrogen, said refined pitch being the product made by separating from a sootless coal-tar pitch all constituents non-liquefiable at 340° C. and insoluble in organic pitch-dissolving agents free from organic acids; subjecting said refined pitch in a refractory vessel free of heavy metals and their oxides to direct thermal decomposition in the liquid phase of said pitch by heating it slowly from the melting point of said pitch to about 600° C. during a period of at least 14 hours and simultaneously drawing off the gaseous decomposition products, whereby the pitch is coked without passing through a gaseous phase, comminuting, adding a binder, and extruding the resulting product under pressure into shaped bodies, and heating the shaped bodies to graphitize the material therein.

13. The method of producing simultaneously two masses of coke, the first mass of coke being suitable for producing a readily graphitizable pitch coke for the manufacture of electrically good conducting electrodes and the second mass of coke being suitable for hard-burning and Soderberg carbons, which comprises placing in communicating compartments of a refractory container respective masses of pitch, the first mass of pitch being in a first compartment and consisting essentially of two parts by weight of a pre-refined pitch substantially free of sooty constituents and heterocyclical compounds of oxygen, sulphur and nitrogen, said pre-refined pitch of said first mass being the product made by separating from a sootless coal-tar pitch all constituents non-liquefiable at 340° C. and insoluble in organic pitch-dissolving solvents free from organic acids, the second mass of pitch consisting essentially of one part by weight of an impure pitch rich in sooty and high-molecular weight constituents, heating directly said first mass of pitch in said first compartment from 340° C. to about 600° C. for a period of about 14 hours to form said first mass of coke therefrom, and simultaneously transferring gaseous products from said first compartment to at least one other compartment to heat said second mass of pitch therein so as to form said second mass of coke.

14. Method according to claim 13, further defined in that said second mass of pitch is positioned concentrically around said first mass of pitch during said period of coke formation.

15. Method according to claim 13, further defined in that said second mass of pitch is positioned in other compartments on opposite sides of said first compartment containing said first mass of pitch.

16. Method according to claim 15, comprising the further step of simultaneously pushing out the resulting coking products from the respective compartments with a common pusher.

17. Method according to claim 15, comprising the further steps of separately pushing out the coking products from said first and other compartments.

18. Method according to claim 10, further defined in that other solid carbon-containing substances are added to the purified pitch coke product after said comminuting, to form a mixture, the proportion of said purified pitch coke being at least 50% by weight of the mixture, the balance being selected from the group consisting of calcined coke from coal and low-sulphur petroleum coke.

19. The method according to claim 10, further defined in that said binder consists essentially of a pitch in accordance with said purified pitch in its condition immediately prior to said coking step.

20. The method according to claim 1, which further comprises the step of maintaining the temperature during said coking step temporarily within 340 and 400° C. for an interval of at least 3 hours to promote coke seed formation, maintaining the molten pitch under super-atmospheric pressure during said seed-forming interval, and thereafter reducing the pressure at least down to the atmospheric value during the subsequent heating at higher temperatures.

21. The method of producing shaped graphite bodies, which comprises preparing a shaped body from graphitizable carbon material prepared from coal tar pitch, impregnating said body with refined sootless coal-tar pitch free of constituents non-liquefiable by subsequent melting of the pitch at 340° C., said constituents consisting mainly of heterocyclical compounds of oxygen, sulphur and nitrogen, said refined pitch being the product made by separating from a sootless coal-tar pitch all constituents non-liquefiable at 340° C. and insoluble in organic pitch-dissolving agents free from organic acids, and subsequently graphitizing the impregnated body.

22. The method of transforming coal tar and coal-tar pitch into a readily graphitizable pitch coke and the manufacture from the latter of electrically good conducting graphite electrodes, which comprises separating from the raw material all sooty and other constituents which are non-meltable below a temperature of 340° C. and insoluble in organic pitch-dissolving agents, said pitch-dissolving agents being selected from the group consisting of benzol, toluol, chlorbenzol, o-dichlor-benzol, dichlorbenzol, anthracene oil, pyridine, chinoline and a liquid tar-distillation product having a boiling point below 340° C., said constituents being predominantly-heterocyclical compounds of oxygen, sulphur and nitrogen, coking the thus refined coal-tar pitch from its liquid phase by slowly heating it from 340° C. to 600° C. during a period of at least 14 hours, continuously removing the gaseous dissociation products evolved from the material during the coking period, comminuting and fabricating the resulting pitch coke product into shaped electrode bodies, and heating the shaped bodies to an incandescent temperature to graphitize the material therein.

23. The method of transforming coal tar and coal-tar pitch into a readily graphitizable pitch coke suitable for use in the manufacture of electrically good conducting graphite electrodes, which comprises separating from the raw material all sooty and other constituents non-liquefiable at a temperature of 340° C. and insoluble in organic pitch-dissolving agents, said separating step being carried out by heating the raw material to a temperature above 340° C. and removing the non-meltable residue, and by extracting the resulting meltable product with at least one solvent selected from the group consisting of benzol, toluol, chlorbenzol, o-dichlor-benzol, dichlorbenzol, anthracene oil, pyridine, chinoline, light oil having a boiling limit of 83°–256° C., trichlorethylene, furfural, and a liquid tar-distillation product having a boiling point below 340° C., coking the thus refined coal-tar pitch from its liquid phase by slowly heating it from 340° C. to 600° C. during a period of at least 14 hours, continuously removing the gaseous dissociation products evolved from the material during the coking period, and comminuting the resulting pitch coke product, whereby the comminuted coke product can be fabricated into shaped bodies and upon heating to incandescent temperature will readily graphitize into a highly electrical conducting product.

References Cited in the file of this patent

UNITED STATES PATENTS

| | | |
|---|---|---|
| 935,180 | Williamson | Sept. 28, 1909 |
| 1,905,423 | Rhodes et al. | Apr. 25, 1933 |
| 2,148,133 | Reuscher et al. | Feb. 21, 1939 |
| 2,376,760 | Elsey | May 22, 1945 |
| 2,582,764 | Bailey | Jan. 15, 1952 |
| 2,631,982 | Donegan | Mar. 17, 1953 |
| 2,683,107 | Juel | July 6, 1954 |
| 2,764,530 | Klemgard | Sept. 25, 1956 |
| 2,774,716 | Kulik | Dec. 18, 1956 |

OTHER REFERENCES

Abraham: Asphalts and Allied Substances, 5th ed., vol. 1, pp. 135—136; pub. 1945, D. Van Nostrand Co., N.Y.

Wilson et al.: Coal Coke and Coal Chemicals, 1950, pp. 188—189, pub. McGraw-Hill Book Co., N.Y.